(12) United States Patent
Takagi

(10) Patent No.: US 8,948,943 B2
(45) Date of Patent: Feb. 3, 2015

(54) DRIVE CONTROL SYSTEM IN SERIES-HYBRID VEHICLE

(75) Inventor: Izumi Takagi, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 452 days.

(21) Appl. No.: 13/340,497

(22) Filed: Dec. 29, 2011

(65) Prior Publication Data

US 2013/0173098 A1 Jul. 4, 2013

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)

(52) U.S. Cl.
USPC .......... 701/22; 701/41; 180/65.21; 180/65.23

(58) Field of Classification Search
CPC .................................................. B60W 10/08
USPC .......... 701/22, 41; 180/65.21, 65.23, 65.265, 180/65.275; 477/3; 903/908, 902
See application file for complete search history.

(56) References Cited

U.S. PATENT DOCUMENTS

| | | | |
|---|---|---|---|
| 2008/0091314 A1* | 4/2008 | Hayashi et al. | 701/22 |
| 2008/0156553 A1* | 7/2008 | Hoogenraad | 180/65.2 |
| 2008/0234096 A1* | 9/2008 | Joshi et al. | 477/3 |
| 2009/0143186 A1* | 6/2009 | Hiramatsu | 475/276 |
| 2011/0093149 A1* | 4/2011 | Tanaka | 701/22 |
| 2011/0165991 A1* | 7/2011 | Wenger et al. | 477/7 |
| 2012/0072076 A1* | 3/2012 | Gustavsson | 701/41 |

FOREIGN PATENT DOCUMENTS

JP 3094701 8/2000

* cited by examiner

*Primary Examiner* — Jason Holloway
*Assistant Examiner* — Rachid Bendidi
(74) *Attorney, Agent, or Firm* — Alleman Hall McCoy Russell & Tuttle LLP

(57) ABSTRACT

A drive control system in a series-hybrid utility vehicle comprises a motor for driving a wheel; a battery; an engine electric generator for generating the electric power charged into the battery; and a controller configured to estimate an SOC value of the battery, and control the motor and the engine electric generator in accordance with an HV mode or an EV mode; wherein when the estimated SOC value is less than a predetermined low threshold, the controller stops electric power supply from the battery to the motor; and when the estimated SOC value is less than a predetermined medium threshold greater than the predetermined low threshold, the controller sets the HV mode, and controls the motor and the engine electric generator such that a driving power of the motor is suppressed in a state where the motor is supplied with the electric power from the battery.

17 Claims, 5 Drawing Sheets

DRIVE CONTROL SYSTEM IN SERIES-HYBRID VEHICLE

BACKGROUND OF THE INVENTION

1. Field of the Invention

The present invention relates to a drive control system in a series-hybrid vehicle.

2. Description of the Related Art

Recently, to achieve a high fuel efficiency and avert air pollution, it has been proposed that a hybrid power unit is incorporated into a utility vehicle. The hybrid power unit includes an internal combustion engine and an electric motor. Exemplary hybrid power units are a series-hybrid power unit, a parallel-hybrid power unit, a split-hybrid power unit, etc., depending on a connection relation of the internal combustion engine, an electric generator, the electric motor, and wheels.

Japanese Patent No. 3,094,701 discloses a control system in a series-hybrid vehicle which switches a driving mode based on a value of SOC (state of charge) of a battery. In accordance with this control system, if the value of SOC is greater than a first predetermined value, an EV (electric vehicle) mode is selected, and the engine is stopped. If the value of SOC is less than the first predetermined value, an HV (hybrid vehicle) mode is selected, and an engine electric generator is activated. If the value of SOC is less than a second predetermined value, electric power consumed in a motor is limited not to exceed a power generation output of the engine electric generator, and the vehicle drives without consuming the electric power stored in the battery. The second predetermined value is less than the first predetermined value.

However, in the above stated conventional control system, if the value of SOC decreases to a value less than the second predetermined value, a driving power of the motor may possibly decrease rapidly with a great magnitude. In this situation, driving feel may be worsened, or uphill driving or driving on a curve may become difficult suddenly. In the conventional control system, to minimize a rapid decrease in the driving power of the motor, the engine electric generator must increase the power generation output, which would result in an increase in the size of the engine electric generator.

SUMMARY OF THE INVENTION

An object of the present invention is to provide a drive control system in a series-hybrid vehicle which is capable of suppressing a rapid decrease in a driving power of a motor when a value of SOC decreases.

A drive control system in a series-hybrid utility vehicle of the present invention comprises a motor for driving a wheel; a battery for storing electric power supplied to the motor; an engine electric generator including an electric generator for generating the electric power charged into the battery and an engine for actuating the electric generator; and a controller configured to estimate an SOC value of the battery, and control the motor and the engine electric generator in accordance with an HV mode in which the utility vehicle drives in a state where the engine electric generator is activated or an EV mode in which the utility vehicle drives in a state where the engine electric generator is deactivated; wherein when the estimated SOC value is less than a predetermined low threshold, the controller stops electric power supply from the battery to the motor; and when the estimated SOC value is less than a predetermined medium threshold greater than the predetermined low threshold, the controller sets the HV mode, and controls the motor and the engine electric generator such that a driving power of the motor is suppressed in a state where the motor is supplied with the electric power from the battery.

In accordance with this configuration, if the SOC value is less than the predetermined low threshold, the electric power supply from the battery to the motor is stopped. Therefore, it is possible to prevent the battery from being discharged to an excessive level, and extend the life of the battery. If the SOC value is not less than the predetermined low threshold and less than the predetermined medium threshold, the driving power of the motor is suppressed, and the motor is actuated by the electric power supplied from the battery in the state where the engine electric generator is activated. That is, before stopping electric power supply from the battery to the motor, the driving power of the motor starts to be suppressed. Because of this, the driver can be informed that the SOC value of the battery is getting closer to the low threshold, although the utility vehicle can be driven in this state. In addition, it is possible to suitably suppress the driving power of the motor from decreasing rapidly when the electric power supply from the battery to the motor is going to be stopped. Thereby, it is possible to prevent the driving feel from worsening, and avoid an increase in the size of the engine electric generator. Further, it is possible to extend a time period which passes from when the SOC value becomes a value less than the medium threshold, until the SOC value becomes the low threshold.

The above and further objects, features and advantages of the invention will more fully be apparent from the following detailed description with reference to the accompanying drawings.

DETAILED DESCRIPTION OF THE PREFERRED EMBODIMENTS

Figure 1:
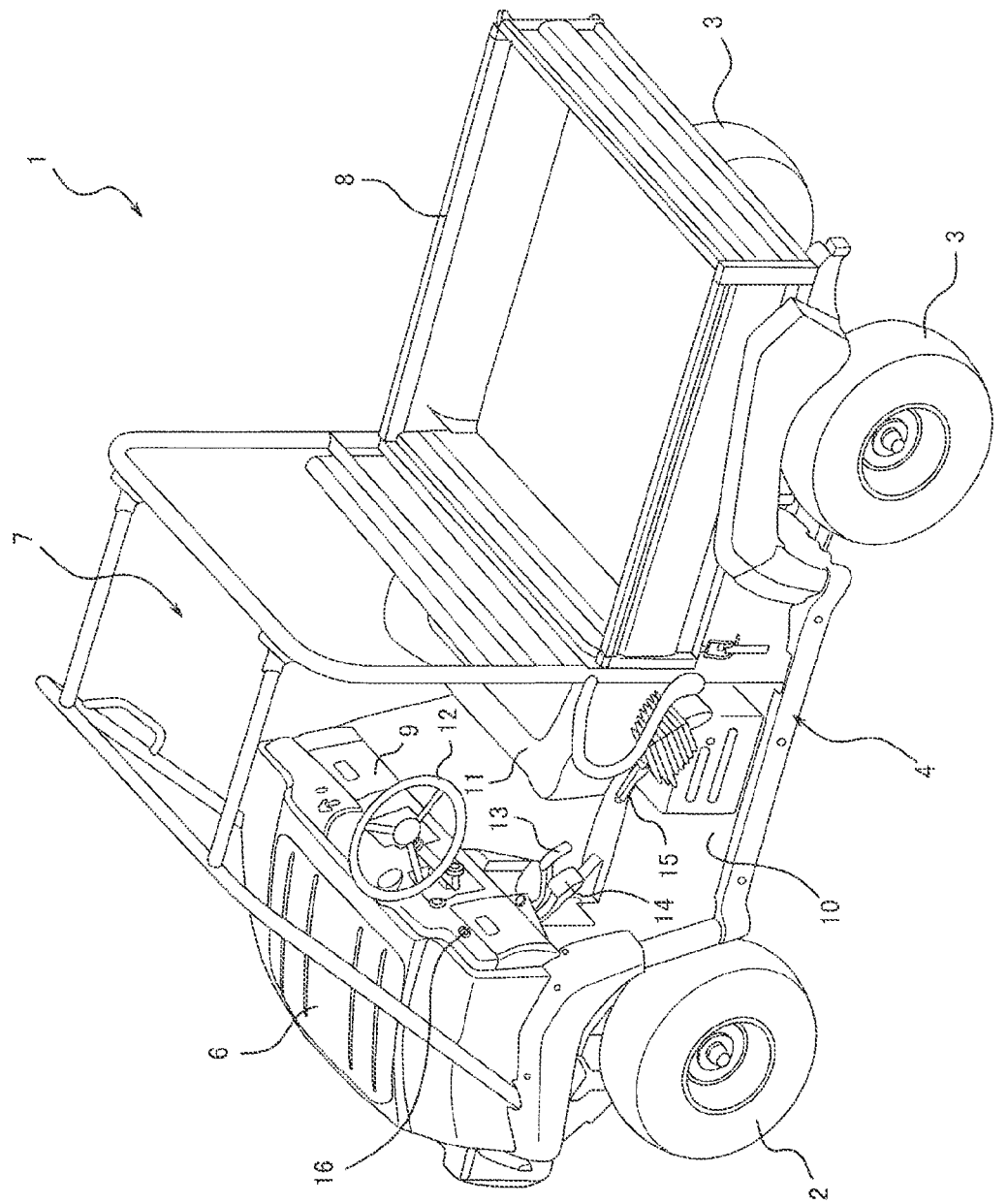
FIG. 1 is a perspective view showing an external appearance of a utility vehicle which is an embodiment of a series-hybrid vehicle of the present invention.

Hereinafter, an embodiment of the present invention will be described with reference to the drawings. Throughout the drawings, the same or corresponding components are identified by the same reference numerals and will not be described in repetition. The stated directions are referenced from the perspective of a driver riding in a series-hybrid vehicle.

FIG. 1 is a perspective view of a utility vehicle 1 which is an embodiment of a series-hybrid vehicle of the present invention. Referring now to FIG. 1, the utility vehicle 1 is used for various uses such as a golf cart or a farming truck. The utility vehicle 1 is a multi-purpose vehicle which is required to have off-road mobility. In the present embodiment, the utility vehicle 1 will be discussed as the hybrid vehicle. But, the present invention may be suitably applied to ATVs (all terrain vehicles), two-wheeled vehicles or three-wheeled vehicles.

As shown in FIG. 1, the utility vehicle 1 includes right and left front wheels 2, right and left rear wheels 3, and a vehicle body 4 from which the four wheels 2 and 3 are suspended. The vehicle body 4 is provided with a hood 6, a cabin space 7 and a cargo bed 8 in this order from forward. Under the hood 6 and the cargo bed 8, there is provided a space in which devices constituting the utility vehicle 1 are laid out. The cabin space 7 is a space for accommodating persons, and positioned at an intermediate portion of the vehicle body 4 in a forward and rearward direction (lengthwise direction of the vehicle body 4). The cabin space 7 is defined by frames constituting the vehicle body 4, a dash board 9, and a floor panel 10 such as a panel member.

A seat 11 and a plurality of driving operation members are arranged in the cabin space 7. The seat 11 is, for example, a laterally elongated bench seat. In the present embodiment, a substantially left part of the cabin space 7 is a space for the driver, and the driver can be seated on the left part of the seat 11. The plurality of driving operation members include, for example, a steering wheel 12, an accelerator pedal 13, a brake pedal 14, a parking brake lever 15, and a mode input device 16. The steering wheel 12 is steered by the driver to steer the right and left front wheels 2 to turn them. The accelerator pedal 13 is depressed (operated) by the driver to regulate a driving power transmitted to the wheels 2(3) or to regulate a vehicle speed of the utility vehicle 1. The brake pedal 14 is depressed by the driver to actuate a brake device 17(18) (see FIG. 2) to brake the wheels 2 (3) in the middle of driving of the utility vehicle 1. The parking brake lever 15 is operated by the driver to actuate the brake device 17 (18) (see FIG. 2) to brake the wheels 2 (3), for parking the utility vehicle 1. The mode input device 16 is a device operated by the driver to select and input a driving mode of the utility vehicle 1. The mode input device 16 may be implemented by, for example, a press button, toggle switch, or a rocker switch.

Figure 2:
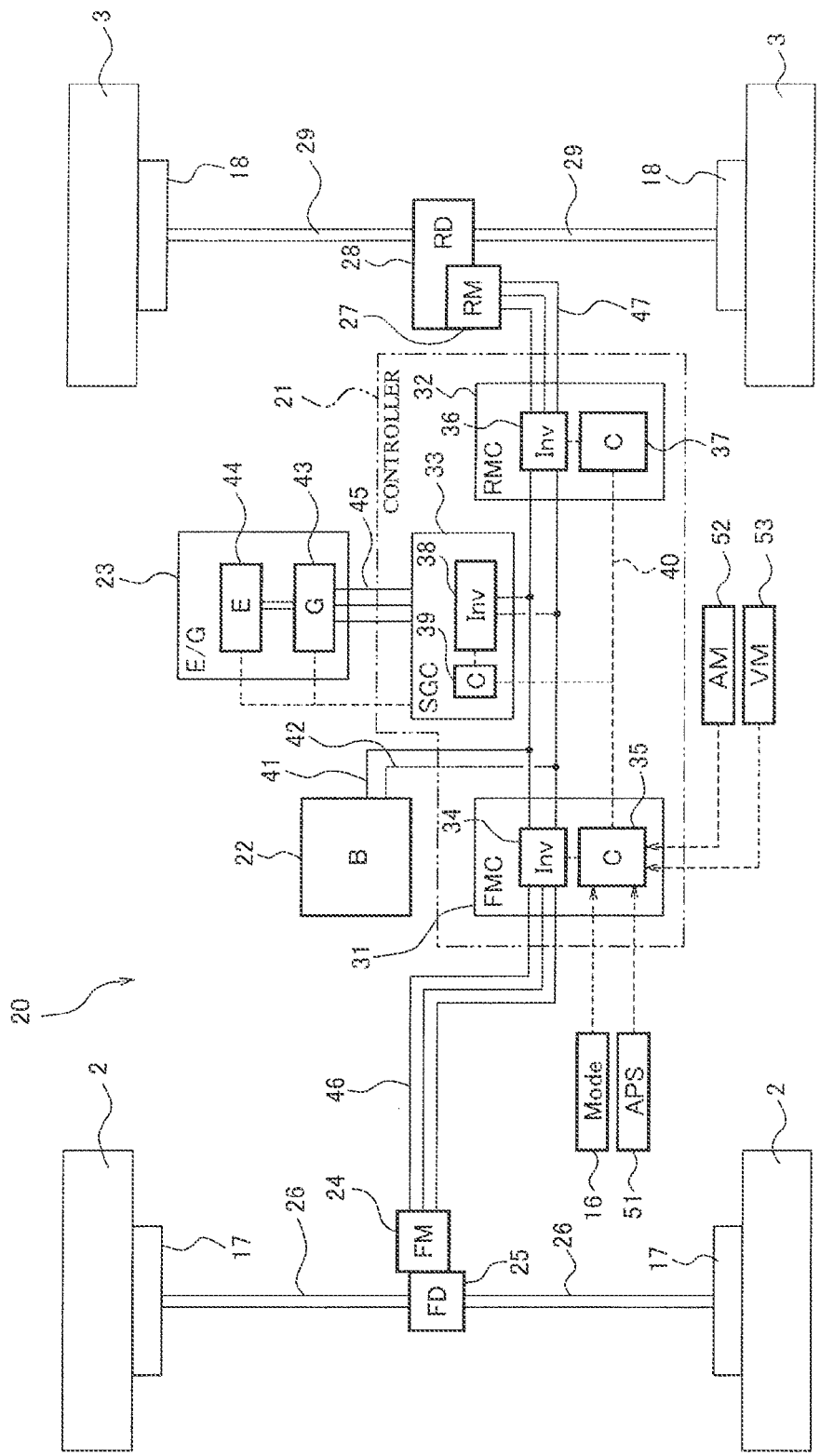
FIG. 2 is a block diagram schematically showing a configuration of a power unit of the utility vehicle of FIG. 1.

FIG. 2 is a block diagram schematically showing a configuration of a drive control system 20 in the utility vehicle 1 of FIG. 1. Referring to FIG. 2, the drive control system 20 includes as major components, a control unit 21, a battery 22, an engine electric generator 23, a front motor 24, a front differential gear 25, a pair of front axles 26, a rear motor 27, a rear differential gear 28, and a pair of rear axles 29.

The control unit 21 includes a front motor driver 31, a rear motor driver 32, and an S/G (starter generator) controller 33. The front motor driver 31 includes a front inverter 34 and a first controller 35. The rear motor driver 32 includes a rear inverter 36 and a second controller 37. The S/G controller 33 includes an electric generator inverter 38 and a third controller 39. The first to third controllers 35, 37, and 39 are configured to control the front inverter 34, the rear inverter 36 and the electric generator inverter 38, respectively. The first to third controllers 35, 37, and 39 are communicatively interconnected via communication lines 40.

The battery 22 is configured to store DC power. The battery 22 is coupled electrically or mechanically to the front inverter 34, the rear inverter 36 and the electric generator inverter 38 via a power supply line 41 and a ground line 42. The engine electric generator 23 includes an electric generator 43 for generating electric power charged into the battery 22, and an engine 44 for actuating the electric generator 43. The electric generator 43 acts as a starter motor for causing the engine 44 to perform cranking. Upon the engine 44 starting to run, the electric generator 43 generates three-phase AC power having a frequency according to the engine speed of the engine 44. The electric generator 43 is coupled electrically or mechanically to the electric generator inverter 38 via AC lines 45.

The front motor 24 is an electric motor actuated by AC power. The front motor 24 is coupled electrically or mechanically to the front inverter 34 via AC lines 46. The output shaft of the front motor 24 is coupled mechanically to the input shaft of the front differential gear 25. The front differential gear 25 is coupled mechanically to the right and left front wheels 2 via a pair of right and left front axles 26, respectively. The rear motor 27 is an electric motor actuated by AC power. The rear motor 27 is coupled to the rear inverter 36 electrically or mechanically to the rear inverter 36 via AC lines 47. The output shaft of the rear motor 27 is coupled mechanically to the input shaft of the rear differential gear 28. The rear differential gear 28 is coupled mechanically to the right and left rear wheels 3 via a pair of right and left rear axles 29, respectively.

When the battery 22 performs discharging, i.e., decreasing the SOC value, the DC power from the battery 22 is supplied to the front inverter 34 and to the rear inverter 36. The front inverter 34 converts the DC power into AC power, which is supplied to the front motor 24 via the AC lines 46. By the AC power, the front motor 24 is actuated to generate driving power for moving the utility vehicle 1. The driving power generated in the front motor 24 is transmitted to the right and left front wheels 2 via the front differential gear 25 and the pair of front axles 26, causing the front wheels 2 to rotate. The same occurs in the rear inverter 36. The rear inverter 36 converts the DC power from the battery 22 into AC power, which is supplied to the rear motor 27 via the AC lines 47. By the AC power, the rear motor 27 is actuated to generate driving power for moving the utility vehicle 1. The driving power generated in the rear motor 27 is transmitted to the right and left rear wheels 3 via the rear differential gear 28 and the pair of rear axles 29, causing the rear wheels 3 to rotate.

When the engine 44 is actuating the electric generator 43, the AC power from the electric generator 43 is supplied to the electric generator inverter 38. The electric generator inverter 38 converts the AC power into DC power. The DC power can be supplied to the battery 22 via the power line 41 and the ground line 42 and is charged into the battery 22. The DC power from the electric generator inverter 38 can also be supplied to the front inverter 34 and to the rear inverter 36. In this case, if the front inverter 34 and the rear inverter 36 operate as described above, the front motor 24 and the rear motor 27 are actuated as described above, to rotate the front wheels 2 and the rear wheels 3.

The control unit 21 controls the operation of the front inverter 34, the operation of the rear inverter 36, the operation of the electric generator inverter 38 and the operation of the engine electric generator 23, based on the driving states of the utility vehicle 1 and the SOC of the battery 22, and thereby controls the front motor 24 and the rear motor 27 along with the engine electric generator 23. The control unit 21 selects one driving mode from among a plurality of driving modes and sets the selected driving mode. The control unit 21 controls the motors 24 and 27 and the engine electric generator 23 in accordance with the selected mode. The plurality of driving modes include an HV (hybrid vehicle) mode in which the utility vehicle 1 is driving in a state where the engine electric generator 23 is activated and an EV (electric vehicle) mode in which the utility vehicle 1 is driving in a state where the engine electric generator 23 is deactivated.

As described above, the control unit 21 includes the first to third controllers 35, 37, and 39, which are configured to perform distributed control of the front inverter 34, the rear inverter 36, the electric generator inverter 38 and the engine electric generator 23. In the present embodiment, it is assumed that the first controller 35 is a master controller and the second and third controllers 37 and 39 are slave controllers. A CPU of the first controller 35 executes a control program stored in a memory of the first controller 35. Thereby, the first controller 35 determines an operation command of the front inverter 34, an operation command of the rear inverter 36, an operation command of the electric generator inverter 38, and an operation command of the engine electric generator 23, based on the driving states and the value of SOC. The operation commands are issued to the second and third controllers 37 and 39 via communication lines 40. The above stated hardware configuration of the control unit 21 is merely exemplary, and can be modified suitably. For example, the second controller 37 or the third controller 39 may be a master controller. Or, a controller for controlling the front motor 24 and a controller for controlling the rear motor 27 may be integrated. Or, all of the controllers 31, 32, and 33 may be integrated.

The control unit 21 is coupled to sensors for detecting the driving states. These sensors include, for example, an accelerator position sensor 51 for detecting a displacement amount (or pedal position) of the accelerator pedal 13 (see FIG. 1) which is depressed by the driver, a current meter (sensor) 52 for detecting a current value of the electric power discharged by the battery 22, and a voltage meter (sensor) 53 for detecting a terminal voltage of the battery 22. The control unit 21 is coupled to the mode input device 16. Since the first controller 35 is the master controller in the present embodiment, the sensors 51-53, and the mode input device 16 are coupled to an input/output interface of the first controller 35.

Figure 3:
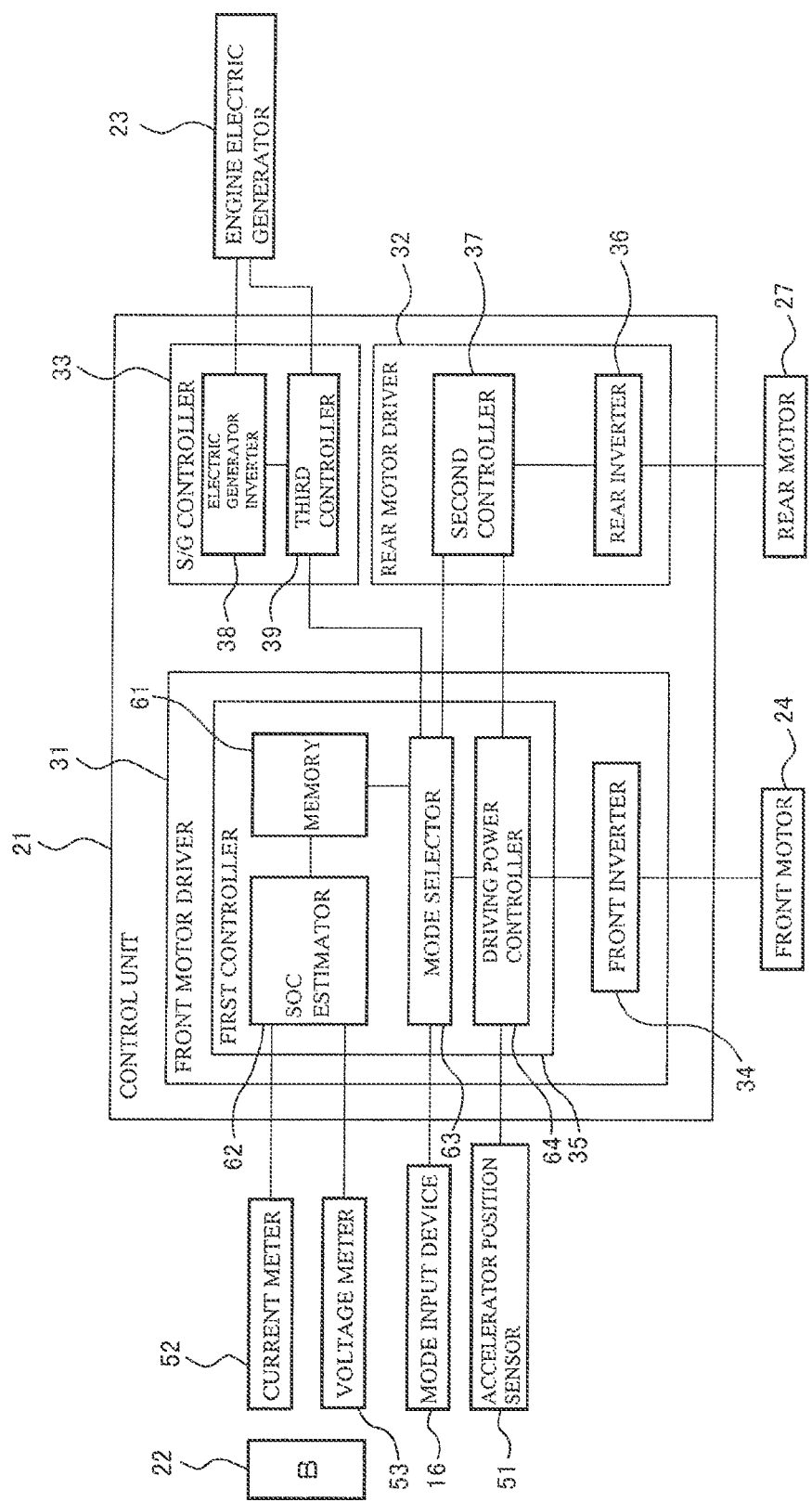
FIG. 3 is a block diagram schematically showing a configuration of a front motor controller, a rear motor controller, and an electric generator controller of FIG. 2.

FIG. 3 is a block diagram showing the configuration of the drive control system 20 of FIG. 2. Referring to FIG. 3, the first controller 35 as the master controller includes a memory 61, an SOC estimator 62, a mode selector 63 and a driving power controller 64, in conjunction with the control executed by the first controller 35. The SOC estimator 62 estimates a value (SOC value) indicating the SOC of the battery 22. The SOC estimator 62 estimates the SOC value based on the current value detected by the current meter 52 and the voltage value detected by the voltage meter 53. The units of SOC may be expressed as percentage points (e.g., 0%=empty, 100%=full). The fully charged state of the battery 22 is 100%.

The mode selector 63 compares the SOC value estimated by the SOC estimator 62 to a plurality of thresholds stored in the memory 61, and selects the HV mode or the EV mode based on a result of comparison. In addition, the mode selector 63 determines which of the driving modes is to be selected, in response to a command input by the driver using the mode input device 16.

The driving power controller 64 controls the operation of the front inverter 34 in accordance with the driving mode set by the mode selector 63, thereby controlling the front motor 24. To derive the operation command of the front inverter 34, the driving power controller 64 refers to at least the output of the accelerator position sensor 51. The second controller 37 controls the operation of the rear inverter 36 in accordance with the driving mode set by the mode selector 63, thereby controlling the rear motor 27. The third controller 39 controls the operation of the electric generator inverter 38 and the operation of the engine electric generator 23 in accordance with the driving mode set by the mode selector 63.

Figure 4:
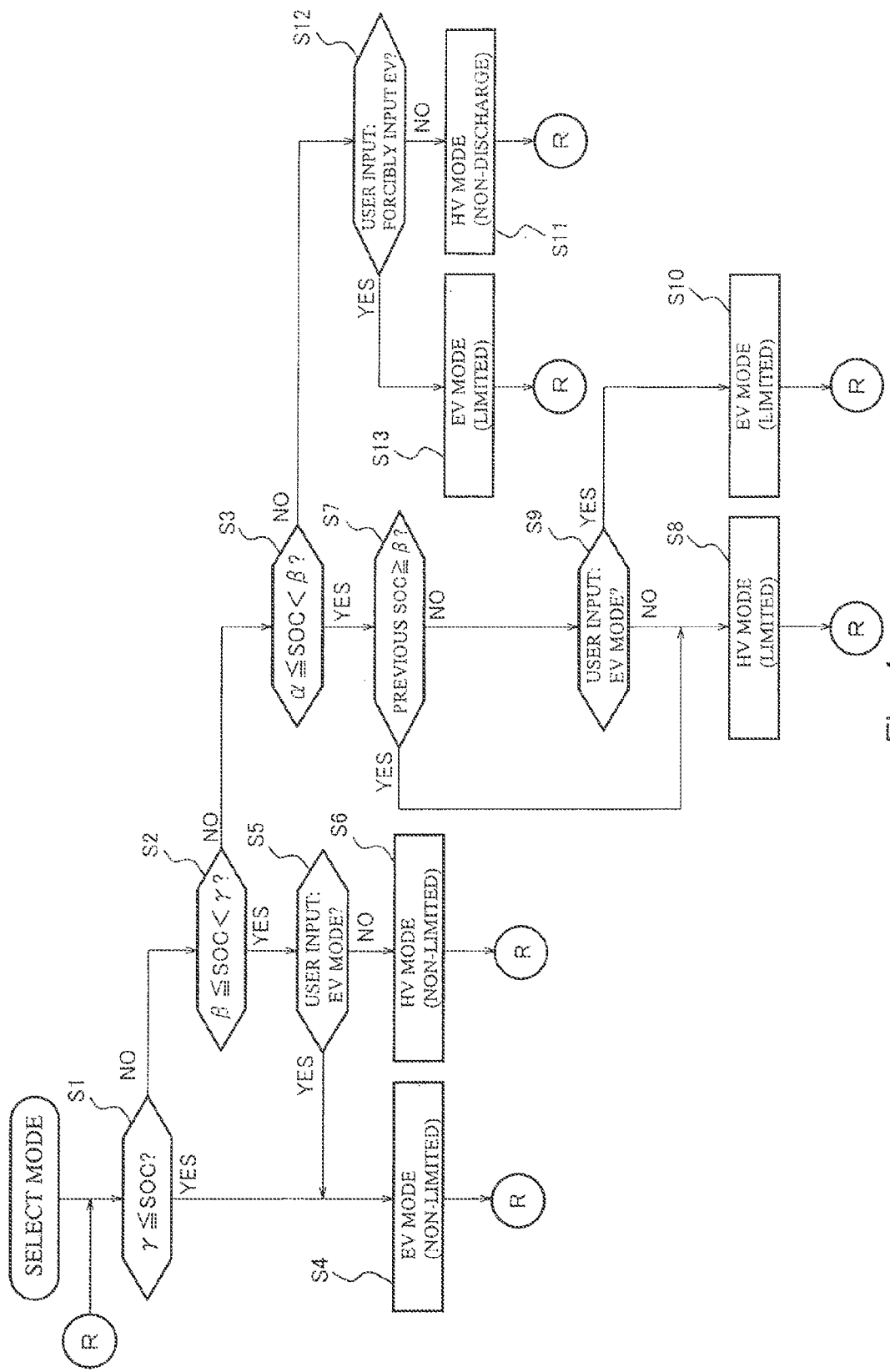
FIG. 4 is a flowchart showing a procedure of a mode selection process executed by a mode selector of FIG. 3.

FIG. 4 is a flowchart showing a procedure for selecting the driving mode. The control procedure shown in FIG. 4 is repeated during a state where an ignition switch is ON. Initially, the mode selector 63 determines whether or not the estimated SOC value is greater than or equal to a high threshold $\gamma$ (step S1). If it is determined that the estimated SOC value is less than the high threshold $\gamma$ (S1: NO), the mode selector 63 determines whether or not the estimated SOC value is greater than or equal to a medium threshold $\beta$ (step S2). If it is determined that the estimated SOC value is less than the medium threshold $\beta$ (S2: NO), the mode selector 63 determines whether or not the estimated SOC value is greater than or equal to a low threshold a (step S3). As described above, the mode selector 63 compares the estimated SOC value to the three thresholds $\alpha$, $\beta$, $\gamma$ and determines which of four numeric ranges defined by the three thresholds $\alpha$, $\beta$, $\gamma$ the estimated SOC value falls in. The high threshold $\gamma$ is a value indicating a state closer to a fully charged state (100%) of the battery 22. The high threshold $\gamma$ is set to, for example, 70-90%. The low threshold $\alpha$ is a value indicating a state from which it is presumed that sulfation of the battery 22 will occur and it would be difficult to restore the life of the battery 22 if the battery 22 is discharged further. The low threshold $\alpha$ is set to, for example, 20-30%. The medium threshold $\beta$ is smaller than the high threshold $\gamma$ and greater than the low threshold $\alpha$. The medium threshold $\beta$ is set to, for example 40-60%.

If it is determined that the estimated SOC value is not less than the high threshold $\gamma$ (S1: YES), the mode selector 63 sets the EV mode irrespective of the command input by the driver using the mode input device 16 (step S4). Because of this, if the SOC value is not less than the high threshold $\gamma$, the driver's operation for selecting the HV mode using the mode input device 16 is disenabled.

If it is determined that the SOC value is not less than the medium threshold $\beta$ and less than the high threshold $\gamma$ (S2: YES), the mode selector 63 determines whether or not the EV mode has been input by the driver using the mode input device 16 (step S5). If it is determined that the EV mode has been inputted (S5: YES), the mode selector 63 sets the EV mode (step S4). On the other hand, if it is determined that the HV mode has been inputted (S5: NO), the mode selector 63 sets the HV mode (step S6).

If it is determined that the SOC value is not less than the low threshold $\alpha$ and less than the medium threshold $\beta$ (S3: YES), the mode selector 63 determines whether or not a previous SOC value is not less than the medium threshold $\beta$ (step S7). If it is determined that the previous SOC value is not less than the medium threshold $\beta$ (S7: YES), the mode selector 63 sets the HV mode irrespective of the command input by the driver using the mode input device 16 (step S8). That is, if the SOC value decreases to a value less than the medium threshold $\beta$, in the state where the EV mode has been input by the mode input device 16, the mode selector 63 may switch the EV mode to the HV mode automatically. If it is determined that the previous SOC value is less than the medium threshold $\beta$ (S7: NO), the mode selector 63 determines whether or not the EV mode has been input by the driver using the mode input device 16 (step S9). If it is determined that the EV mode has been input by the driver using the mode input device 16 (S9: YES), the mode selector 63 sets the EV mode (step S10). If it is determined that the HV mode has been input by the driver using the mode input device 16 (S9: NO), the mode selector 63 sets the HV mode (step S8). In the HV mode set in step S8, or in the EV mode set in step S10, the driving power of the motor 24 (27) is suppressed, and the electric power is supplied from the battery 22 to the motor 24 (27).

If it is determined that the SOC value is less than the low threshold $\alpha$ (S3: NO), in principle, the mode selector 63 sets the HV mode (step S11). In the manner as described above, if the SOC value decreases to a value less than the low threshold $\alpha$, in the state where the EV mode has been input by the driver using the mode input device 16, the mode selector 63 may switch the EV mode to the HV mode automatically. In the HV mode set in the state where the SOC value is less than the low threshold α, the control unit 21 stops the electric power supply from the battery 22 to the motor 24 (27), and actuates the motor 24 (27) by the electric power generated by the engine electric generator 23.

However, even in the case where the SOC value is less than the low threshold α, the mode selector 63 determines whether or not the EV mode has been forcibly input by the driver using the mode input device 16 (step S12). For example, in a case where the mode input device 16 is a press button, the mode selector 63 determines whether or not the mode input device 16 has been pressed for a long period of time. Other suitable method may be used as a method for forcibly inputting the EV mode, instead of pressing the press button for a long period of time. Or, a member exclusively for forcible inputting the EV mode may be provided, separately from the mode input device 16. If it is determined that the EV mode has not been forcibly inputted by the driver (S12: NO), the mode selector 63 sets the HV node (step S11). On the other hand, if it is determined that the EV mode has been forcibly inputted by the driver (S12: YES), the mode selector 63 sets the EV node (step S13).

Figure 5:
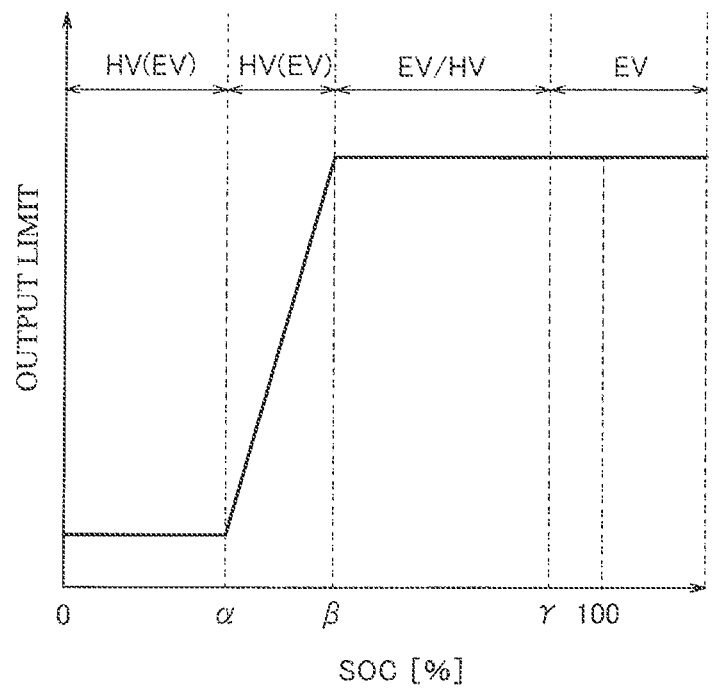
FIG. 5 is a graph conceptually showing the relation between an SOC (state of charge) value and an output limit value, in conjunction with driving modes.

FIG. 5 is a graph showing the relation between the SOC value and a limiter of electric power consumption of the motor 24 (27), and the relation between the SOC value and the set driving mode. As can be seen from FIG. 5, when the SOC value is not less than the high threshold γ, the limiter of electric power consumption is rated electric power consumption. In other words, the driving power of the motor 24 (27) is not virtually suppressed. The EV mode is set as the driving mode irrespective of a command inputted by the driver. When the SOC value is not less than the high threshold γ, the battery is closer to the fully charged state. In such a situation, since the electric power stored in the battery 22 is consumed and the engine electric generator 23 is deactivated, the battery 22 can be prevented from being charged excessively.

When the SOC value is not less than the medium threshold β and less than the high threshold γ, the limiter of electric power consumption is also rated electric power consumption, and the driving power of the motor 24(27) is not virtually suppressed. Since the driving power is generated as intended by the driver, good driving feeling is achieved. In this case, also, the HV mode may be set if the driver wishes to. If the SOC value is less than the high threshold γ, the engine electric generator 23 may be activated to charge the battery 22, without a possibility of excessive charging of the battery 22. As a result, the utility vehicle 1 can drive in a state where the driving power of the motor 24 (27) is not suppressed, while preventing the SOC value from decreasing rapidly.

When the SOC value is less than the low threshold α, electric power supply from the battery to the motor 24 (27) is stopped. In other words, the motor 24 (27) is actuated only by the electric power generated by the engine electric generator 23. This makes it possible to prevent the battery 22 from discharging to an excessive level, and hence extend the life of the battery 22. In principle, when the SOC value is less than the low threshold α, the HV mode is selected. However, in the present embodiment, even in such a situation, the EV mode can be set forcibly by the driver using the mode input device 16. With the EV mode being set forcibly, the control unit 21 controls the motor 24 (27) in accordance with the EV mode irrespective of the SOC value. As a result, even when the SOC value is less than the low threshold α, the utility vehicle 1 can drive in the state where the engine 44 is stopped. Even in a case where the SOC value becomes less than the low threshold α during driving within a closed space, for example, the utility vehicle 1 is used for green house farming, emission of exhaust gas from the engine 44 to the closed space can be prevented. In this way, air pollution within the closed space can be prevented.

In principle, when the SOC value is not less than the low threshold α and less than the medium threshold β, the HV mode is selected. If the SOC value decreases to a value less than the medium threshold β, in a state where the SOC value is not less than the medium threshold β, and the EV mode has been inputted by the driver using the mode input device 16, the control unit 21 switches the EV mode to the HV mode automatically. This makes it possible to save electric power consumption in the battery 22 effectively.

And, the driving power of the motor 24 (27) is suppressed, and the motor 24 (27) is actuated in such a manner that the motor 24 (27) is supplied with the electric power from the battery 22 in the state where the engine electric generator 23 is activated. In other words, before stopping electric power supply from the battery 22 to the motor 24 (27), the driving power of the motor 24 (27) starts to be suppressed. Because of this, the driver can be informed that the SOC value of the battery 22 is getting closer to the low threshold α, although the utility vehicle 1 can still be driving. In addition, it is possible to suitably suppress the driving power of the motor 24 (27) from decreasing rapidly when the electric power supply from the battery 22 to the motor 24 (27) is stopped. Thereby, it is possible to prevent the driving feel from getting worse, and avoid an increase in the size of the engine electric generator 23. Further, it is possible to extend a time period which passes from when the SOC value becomes a value less than the medium threshold β, until the SOC value becomes the low threshold α.

When the SOC value is not less than the low threshold α and less than the medium threshold β, the control unit 21 suppresses the driving power of the motor 24 (27) such that the degree to which the driving power of the motor 24 (27) is suppressed increases as the SOC value decreases. Since the degree to which the driving power of the motor 24 (27) is suppressed increases as the SOC value decreases, it is possible to effectively prevent the driving power of the motor 24 (27) from decreasing rapidly with a great magnitude after the SOC value becomes a value less than the medium threshold β. As a result, it is possible to prevent the driving experience from getting worse. Also, the driver can be informed that the SOC value of the battery 22 is getting closer to the low threshold α.

In this case, the control unit 21 suppresses the driving power of the motor 24 (27) so that the limiter (allowable maximum driving power in the motor 24 (27)) of electric power consumption in the motor 24 (27) is not less than the electric power generated by the engine electric generator 23. In this way, the driving power of the motor 24 (27), which is not less than the electric power generated by the engine electric generator 23, can be ensured, even though the driving power of the motor 24 (27) is suppressed. Therefore, driving mobility of the utility vehicle 1 can be maintained while lessening consumption of electric power stored in the battery 22. In the present embodiment, a power generation capacity of the engine electric generator 23 is smaller than average electric power consumption of the motor 24 (27). The average electric consumption is defined as electric power consumption per unit time under standard driving conditions, for example, an average value of electric power consumption per unit time in a case where the utility vehicle 1 drives over a certain long distance, or a case where the utility vehicle 1 is cruising at a speed of 25 miles per hour on a flat and dry road surface. Data of the average electric power consumption is obtained by a driving test using a test car. As described above, by using the medium threshold β, it becomes possible to extend a time period which passes until the SOC value becomes the low threshold α, while preventing a rapid decrease in the SOC value. As a result, the engine electric generator 23 can be decreased in size.

Although in the drive control system 20 of the present embodiment, the single front motor 24 drives the right and left front wheels 2 and the single rear motor 27 drives the right and left rear wheels 3, this is exemplary. For example, the front motor 24 may be omitted, or the rear motor 27 may be omitted. Or, either the front motor 24 or the rear motor 27 may drive the four wheels 2 and 3. Or, a wheel-in type may be used, in which two front motors 24 drive the right and left front wheels 2, respectively, and two rear motors 27 drive the right and left rear wheels 3, respectively.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A drive control system in a series-hybrid utility vehicle comprising:
    a motor for driving a wheel;
    a battery for storing electric power supplied to the motor;
    an engine electric generator including an electric generator for generating the electric power charged into the battery and an engine for actuating the electric generator; and
    a controller configured to estimate an SOC value of the battery, and control the motor and the engine electric generator in accordance with an HV mode in which the utility vehicle drives in a state where the engine electric generator is activated or an EV mode in which the utility vehicle drives in a state where the engine electric generator is deactivated;
    wherein the controller compares the estimated SOC value to a predetermined low threshold and a predetermined medium threshold greater than the predetermined low threshold;
    wherein when the estimated SOC value is less than the predetermined low threshold, the controller controls the motor and the engine electric generator such that electric power supply from the battery to the motor is stopped and the electric power generated in the engine electric generator is supplied to the motor; and
    when the estimated SOC value is not less than the predetermined low threshold and less than the predetermined medium threshold, the controller sets the HV mode, and controls the motor and the engine electric generator such that an allowable maximum driving power of the motor is suppressed in a state where the motor is supplied with the electric power from the battery.

2. The drive control system in the series-hybrid utility vehicle, according to claim 1,
    wherein when the estimated SOC value is not less than the predetermined low threshold and less than the predetermined medium threshold, the controller suppresses the allowable maximum driving power of the motor such that a degree to which the driving power is suppressed increases as the SOC value decreases.

3. The drive control system in the series-hybrid utility vehicle according to claim 1,
    wherein when the estimated SOC value is not less than the predetermined low threshold and less than the predetermined medium threshold, the controller suppresses the allowable maximum driving power of the motor such that a maximum driving power of the motor becomes a limited value which is not less than electric power output from the engine electric generator.

4. The drive control system in the series-hybrid utility vehicle according to claim 1,
    wherein an electric power generation capacity of the engine electric generator is set smaller than an average electric power consumption of the motor.

5. The drive control system in the series-hybrid utility vehicle according to claim 1, further comprising:
    a mode input device which is operated by a driver to selectively input the HV mode or the EV mode as a driving mode of the vehicle;
    wherein the controller compares the estimated SOC value to the predetermined low threshold, the predetermined medium threshold, and a predetermined high threshold greater than the predetermined medium threshold;
    wherein the controller sets the driving mode in accordance with the driving mode inputted by the mode input device when the estimated SOC value is not less than the predetermined medium threshold and less than the predetermined high threshold.

6. The drive control system in the series-hybrid utility vehicle according to claim 5,
    when the estimated SOC value decreases a value less than the predetermined medium threshold in a state where the EV mode has been inputted by the mode input device, the controller switches the EV mode to the HV mode automatically, and controls the motor and the engine electric generator such that the allowable maximum driving power of the motor is suppressed in a state where the motor is supplied with the electric power from the battery.

7. The drive control system in the series-hybrid utility vehicle according to claim 1, further comprising:
    a forcible mode input device which is operated by a driver to forcibly set the EV mode;
    wherein in a state where the EV mode is forcibly set by the forcible mode input device, the controller controls the motor in accordance with the EV mode irrespective of the estimated SOC value.

8. The drive control system in the series-hybrid utility vehicle according to claim 5
    wherein when the estimated SOC value is not less than the predetermined high threshold, the controller controls the motor in accordance with the EV mode irrespective of the driving mode inputted by the mode input device.

9. A drive control system in a series-hybrid utility vehicle comprising:
    a motor for driving a wheel;
    a battery for storing electric power supplied to the motor;
    an engine electric generator including an electric generator for generating the electric power charged into the battery and an engine for actuating the electric generator;
    a controller configured to estimate an SOC value of the battery, and control the motor and the engine electric generator in accordance with an HV mode in which the utility vehicle drives in a state where the engine electric generator is activated or an EV mode in which the utility vehicle drives in a state where the engine electric generator is deactivated; and
    a mode input device which is operated by a driver to selectively input the HV mode or the EV mode;

wherein the controller compares the estimated SOC value to a predetermined medium threshold and a predetermined high threshold greater than the predetermined medium threshold;

wherein when the estimated SOC value is not less than the predetermined medium threshold and less than the predetermined high threshold, the controller sets a driving mode in accordance with the driving mode inputted by the mode input device; and wherein when the estimated SOC value is not less than the predetermined high threshold, the controller disenables an input operation for selecting the HV mode which is performed by using the mode input device even though the input operation is performed, and controls the motor in accordance with the EV mode.

10. A drive control system in a series-hybrid utility vehicle comprising:

a motor for driving a wheel;

a battery for storing electric power supplied to the motor;

an engine electric generator including an electric generator for generating the electric power charged into the battery and an engine for actuating the electric generator; and a controller configured to estimate an SOC value of the battery, and control the motor and the engine electric generator in accordance with an HV mode in which the utility vehicle drives in a state where the engine electric generator is activated or an EV mode in which the utility vehicle drives in a state where the engine electric generator is deactivated;

wherein the controller compares the estimated SOC value to a predetermined low threshold and a predetermined medium threshold greater than the predetermined low threshold;

wherein when the estimated SOC value is less than the predetermined low threshold during driving, the controller sets the HV mode, and controls the motor and the engine electric generator such that the electric power stored in the battery is not supplied to the motor, the electric power generated in the engine electric generator is supplied to the motor, and an allowable maximum driving power of the motor is suppressed, and in this state the wheel is driven; and when the estimated SOC value is not less than the predetermined low threshold and less than the predetermined medium threshold during driving, the controller sets the HV mode, and controls the motor and engine electric generator such that the electric power is supplied from the battery to the motor, the electric power generated in the engine electric generator is supplied to the motor, and the allowable maximum driving power of the motor is suppressed, and in this state the wheel is driven.

11. The drive control system in the series-hybrid utility vehicle, according to claim 10, wherein when the estimated SOC value is less than the predetermined low threshold during driving, the controller controls the motor and the engine electric generator such that electric power supply from the battery to the motor is stopped and the electric power generated in the engine electric generator is supplied to the motor, and in this state drives the drive wheel.

12. The drive control system in the series-hybrid utility vehicle, according to claim 10, wherein the estimated SOC value is less than the predetermined low threshold during driving, the controller controls the motor and the engine electric generator such that only the electric power generated in the engine electric generator is supplied to the motor, and in this state drives the drive wheel.

13. The drive control system in the series-hybrid utility vehicle, according to claim 10, further comprising:

a motor inverter connected to the motor; and an electric generator inverter connected to the engine electric generator;

wherein when the estimated SOC value is less than the predetermined medium threshold during driving, AC power generated in the engine electric generator is supplied to the electric generator inverter, the electric generator inverter coverts the AC power into DC power, the DC power is supplied to the motor inverter, the motor inverter converts the DC power into the AC power, the AC power is supplied to the motor, and in this state the motor is driven.

14. The drive control system in the series-hybrid utility vehicle, according to claim 10, wherein when the estimated SOC value is not less than the predetermined low threshold and less than the predetermined medium threshold during driving, a suppressed amount of the allowable maximum driving power of the motor increases as the SOC value decreases.

15. The drive control system in the series-hybrid utility vehicle, according to claim 10, wherein when the estimated SOC value is not less than the predetermined medium threshold during driving, the allowable maximum driving power of the motor is not suppressed.

16. The drive control system in the series-hybrid utility vehicle, according to claim 10, wherein when the estimated SOC value is not less than the predetermined medium threshold during driving, the controller controls the motor and the engine electric generator such that the engine electric generator is deactivated and the electric power stored in the battery is supplied to the motor.

17. The drive control system in the series-hybrid utility vehicle, according to claim 10, wherein when the estimated SOC value is less than the predetermined medium threshold during driving, the allowable maximum driving power of the motor is set to a value equal to a greater than a value of a driving power generated in the engine electric generator.

* * * * *